(12) United States Patent
Mizusawa

(10) Patent No.: US 12,722,725 B2
(45) Date of Patent: Sep. 1, 2026

(54) RUBBER CRAWLER AND CORE

(71) Applicant: BRIDGESTONE CORPORATION, Tokyo (JP)

(72) Inventor: Takashi Mizusawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 518 days.

(21) Appl. No.: 18/366,044

(22) Filed: Aug. 7, 2023

(65) Prior Publication Data

US 2024/0051626 A1 Feb. 15, 2024

(30) Foreign Application Priority Data

Aug. 9, 2022 (JP) ................................ 2022-127408

(51) Int. Cl.

| | |
|---|---|
| ***B62D 55/253*** | (2006.01) |
| ***B62D 55/08*** | (2006.01) |
| ***B62D 55/20*** | (2006.01) |
| ***B62D 55/24*** | (2006.01) |

(52) U.S. Cl.

CPC ........... *B62D 55/253* (2013.01); *B62D 55/08* (2013.01); *B62D 55/20* (2013.01); *B62D 55/24* (2013.01); *B62D 55/244* (2013.01)

(58) Field of Classification Search

CPC .... B62D 55/24; B62D 55/242; B62D 55/244; B62D 55/18; B62D 55/20; B62D 55/202

See application file for complete search history.

(56) References Cited

U.S. PATENT DOCUMENTS

| | | | | |
|---|---|---|---|---|
| 5,522,655 A * | 6/1996 | Katoh | .................. | B62D 55/244 305/167 |
| 2010/0013297 A1* | 1/2010 | Kimura | ................ | B62D 55/244 305/177 |
| 2010/0096916 A1* | 4/2010 | Kato | .................... | B62D 55/205 305/170 |

FOREIGN PATENT DOCUMENTS

| | | | | |
|---|---|---|---|---|
| EP | 0493875 A1 * | 7/1992 | ............. | B62D 55/24 |
| JP | H0558357 A | 3/1993 | | |
| JP | H092346 A | 1/1997 | | |
| JP | 2005212741 A | 8/2005 | | |
| JP | 2006035979 A | 2/2006 | | |
| JP | 2010208463 A | 9/2010 | | |
| JP | 2010264850 A | 11/2010 | | |
| JP | 2013189507 A | 9/2013 | | |

OTHER PUBLICATIONS

Dec. 15, 2023, search result of the Extended European Search Report issued by the European Patent Office in the corresponding European Patent Application No. 23189668.9.

* cited by examiner

*Primary Examiner* — S. Joseph Morano
*Assistant Examiner* — Alex Palmer
(74) *Attorney, Agent, or Firm* — KENJA IP LAW PC

(57) ABSTRACT

A rubber crawler 1 includes an endless crawler body 12 made of rubber, and a plurality of cores 13 embedded in the crawler body and arranged along the crawler circumferential direction, where at least a first projection on the crawler width direction first side in a pair of first projections of each core has a first recess R1 on a surface facing a second projection of another core of the surfaces on the two sides in the crawler width direction.

6 Claims, 11 Drawing Sheets

12
121
13
13
A
16
16
1
A
CD
WD1
CD1
CD2
WD
WD2

Cross section of A-A

Cross section of B-B 13B
13Bw
13P1
R1
13P1a
D
C
13Ca
13Bc
13P1a
R1
13P1
13C
13P2
13C
13P2
13
13Bw
TD
WD1
WD
CD1
IS
OS
CD2
CD
WD2

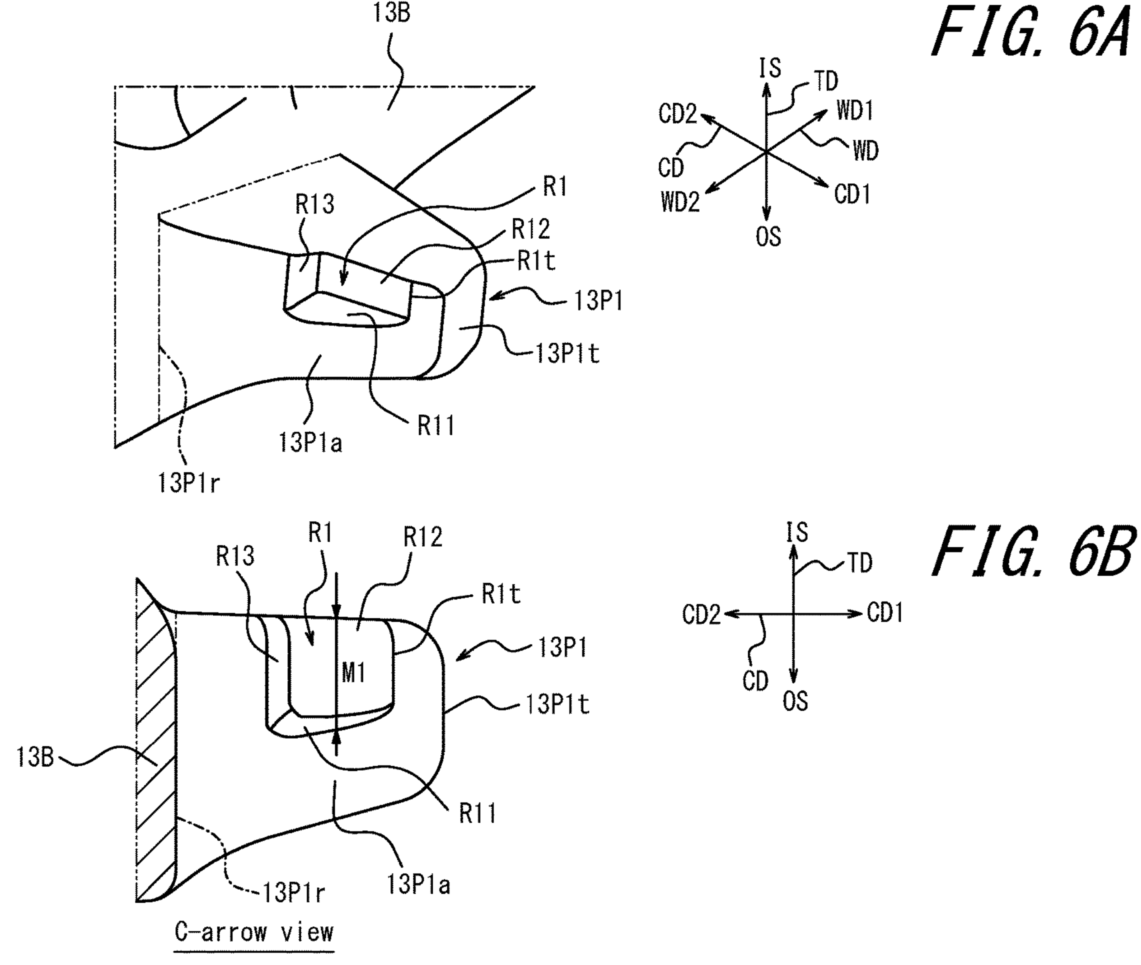
FIG. 6A
13B
R1
R13
R12
R1t
13P1
13P1t
R11
13P1a
13P1r
IS
TD
WD1
WD
CD2
CD
CD1
WD2
OS
FIG. 6B
R1
R13
R12
R1t
13P1
M1
13P1t
13B
R11
13P1r
13P1a
C-arrow view
IS
TD
CD2
CD1
CD
OS
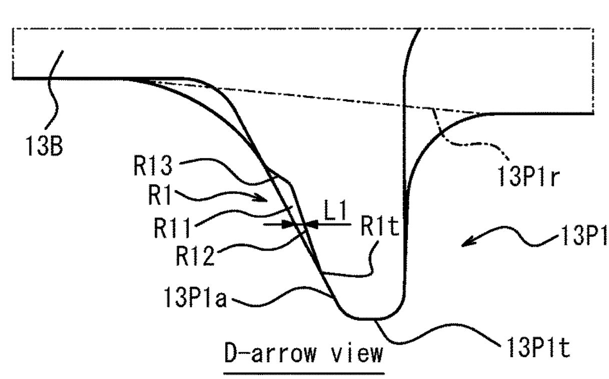
13B
13P1r
R13
R1
L1
R11
R1t
13P1
R12
13P1a
D-arrow view
13P1t
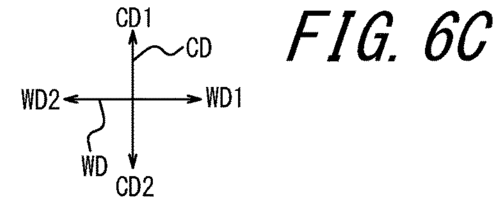
FIG. 6C
CD1
CD
WD2
WD1
WD
CD2

13B
R2
R22
R23
R2t
13P2
13P2t
R21
13P2r
13P2a
IS
TD
WD1
CD1
CD
CD2
WD2
OS
WD

R2
R22
R23
M2
13P2
R2t
13P2t
13B
13P2r
R21
13P2a
E-arrow view
IS
TD
CD2
CD1
CD
OS 13P2a
13P2t
13P2
R22
R2
R2t
R21
L2
R23
13P2r
13B
F-arrow view
CD2
CD
WD2
WD1
WD
CD1

15
15
13
13
13
13P2
13P2
13P2
R2
13P1
13P1
13P1
13P1
13P1
13P1
CD
CD1
CD2
WD
WD1
WD2
TD
IS
OS
G
R1

RUBBER CRAWLER AND CORE

TECHNICAL FIELD

This disclosure relates to a rubber crawler and a core.

BACKGROUND

In a conventional rubber crawler, a core may include a projection extending in the crawler circumferential direction that protrudes from a base portion extending in the crawler width direction, to prevent side slip or the like (for example, see JP 2005-212741 A (PTL 1)).

CITATION LIST

Patent Literature

PTL 1: JP 2005-212741 A

SUMMARY

When a conventional rubber crawler is bent around a sprocket or the like, the cores are close to each other, and the clearance (gap) between the projections of adjacent cores is too narrow. As a result, the flexural rigidity of the rubber crawler is too high, which may make it difficult to wind the rubber crawler around a rotator and increase the loss of driving force.

It could thus be helpful to provide a rubber crawler and a core which can enlarge the clearance between projections of adjacent cores when a rubber crawler is bent around a sprocket or the like.

[1] A rubber crawler comprising:

an endless crawler body made of rubber, and a plurality of cores embedded in the crawler body and arranged along a crawler circumferential direction, wherein each of the cores comprises:

a base portion extending in a crawler width direction, a pair of horn portions extending from the base portion to a crawler inner circumferential side, a pair of first projections extending from the base portion to a crawler circumferential direction first side, and a pair of second projections extending from the base portion to a crawler circumferential direction second side, wherein the pair of first projections of each of the cores respectively face the pair of second projections of another core adjacent to the core on the crawler circumferential direction first side in a crawler width direction, at least a first projection on a crawler width direction first side in the pair of first projections of each of the cores has a first recess on a surface facing the second projection of another core of surfaces on two sides in a crawler width direction, in the first recess, an end on a side of a tip of the first projection in a crawler circumferential direction of the first recess is positioned closer to a side of a root of the first projection than a tip of the first projection in a crawler circumferential direction, for the first recess, in a portion including at least an end on a side of a tip of the first projection in a crawler circumferential direction, a length in a crawler width direction increases as it goes toward a side of a root of the first projection in a crawler circumferential direction, the first recess is open on a crawler inner circumferential side and closed on a crawler outer circumferential side, and the first recess has a substantially triangular prism shape.

[4] The core used in the rubber crawler described above.

According to the present disclosure, it is possible to provide a rubber crawler and a core which can enlarge the clearance between projections of adjacent cores when a rubber crawler is bent around a sprocket or the like.

BRIEF DESCRIPTION OF THE DRAWINGS

In the accompanying drawings:

FIG. 6A is an enlarged view of the first projection in FIG. 5, FIG. 6B is a C-arrow view illustrating the first projection in FIG. 5 when viewed in the direction of the C arrow, and FIG. 6C is a D-arrow view illustrating the first projection in FIG. 5 when viewed in the direction of the D arrow;

FIG. 9 is a perspective view illustrating a plurality of adjacent cores when the rubber crawler in FIG. 1 is bent around a sprocket or the like;

DETAILED DESCRIPTION

Figure 1:
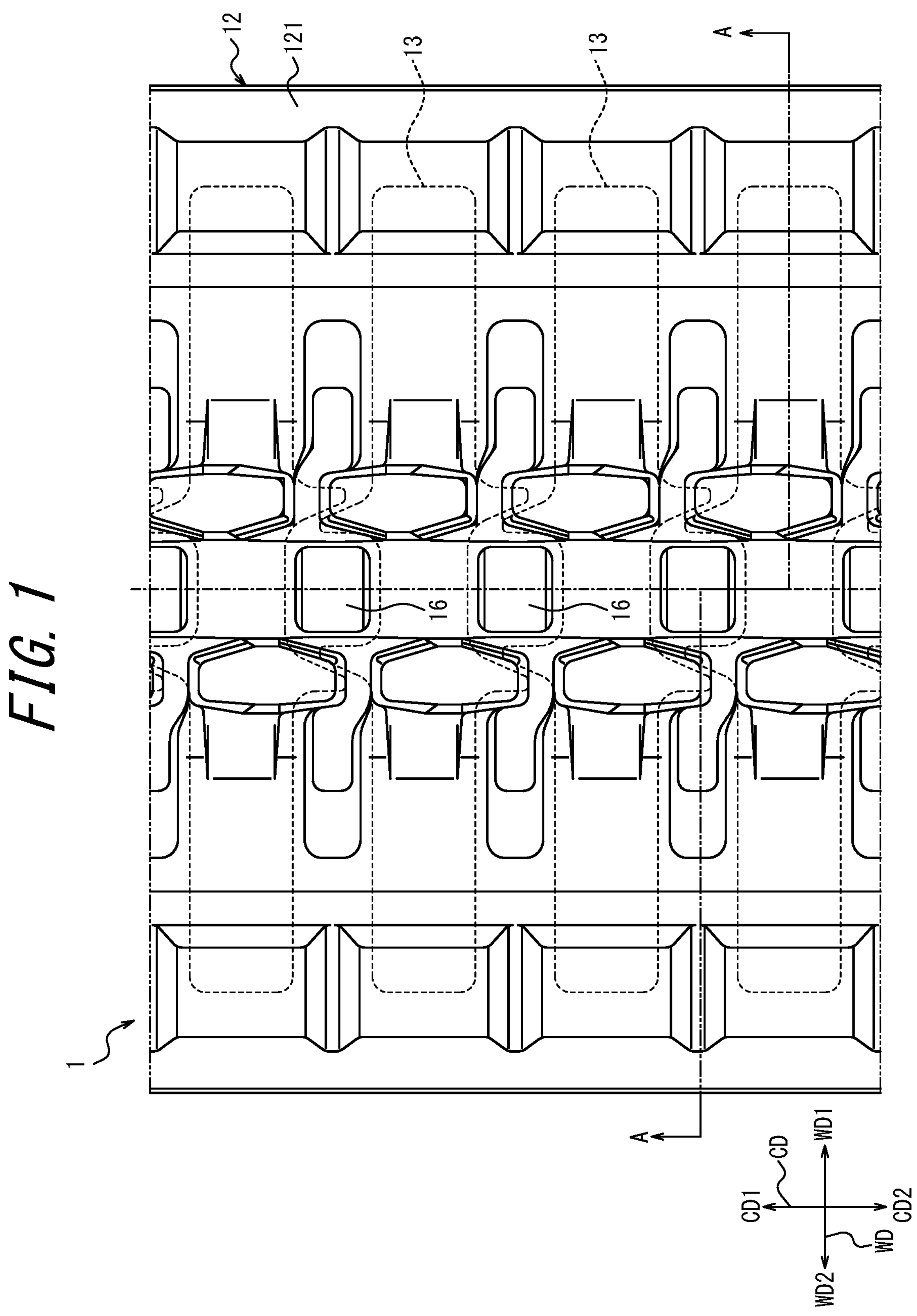
FIG. 1 schematically illustrates a rubber crawler according to an embodiment of the present disclosure as viewed from the crawler inner circumferential side.

The rubber crawler of the present disclosure can be suitably mounted on a foot portion of any traveling machine such as a construction machine (for example, a compact excavator) or an agricultural machine (for example, a tractor or a combine).

The following describes embodiments of the rubber crawler and the core of the present disclosure with reference to the drawings.

The same components in the drawings are denoted by the same reference numerals.

Figure 2:
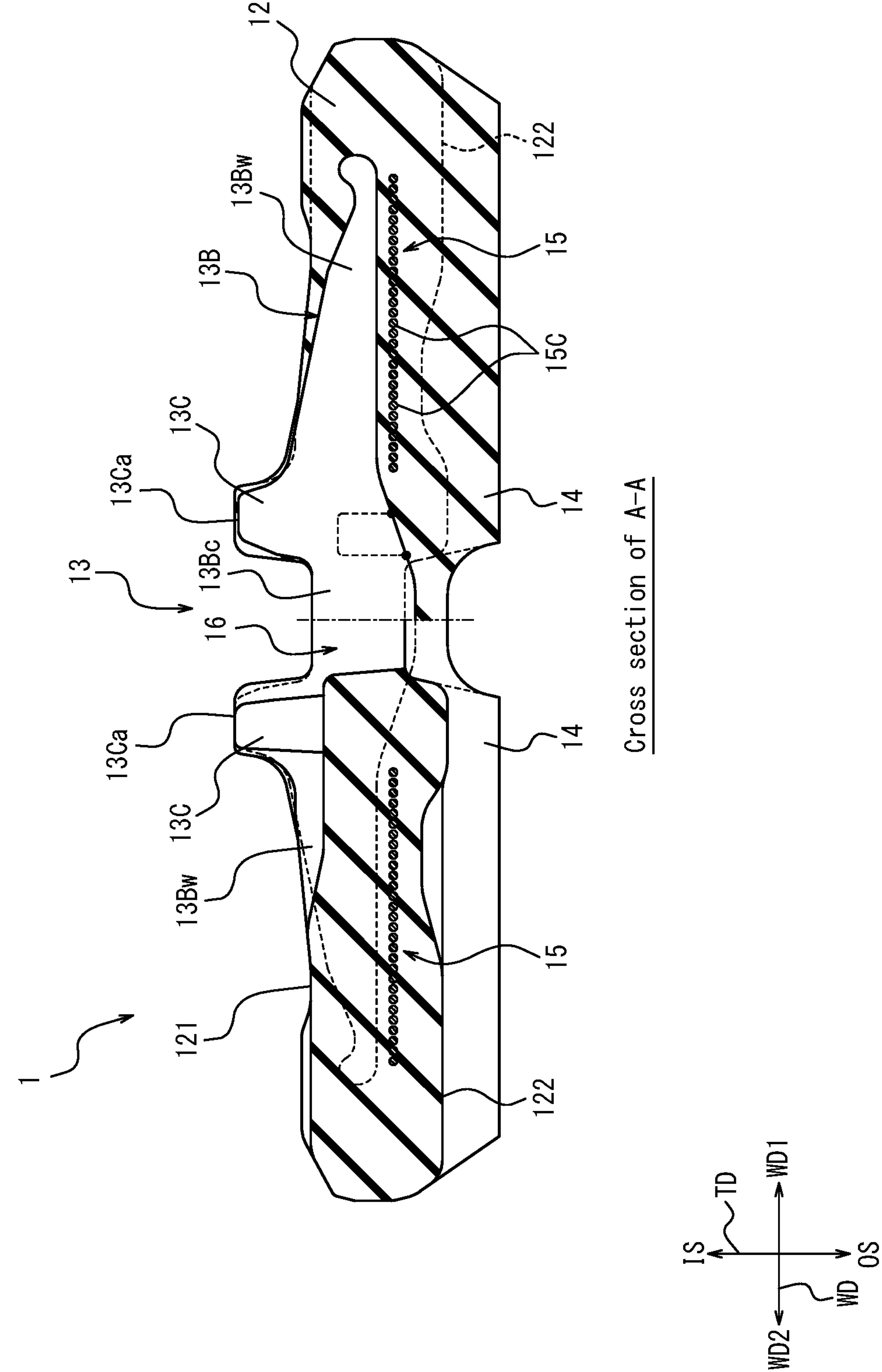
FIG. 2 is a cross-sectional view taken along the line A-A of FIG. 1, illustrating a cross section of A-A of the rubber crawler of FIG. 1.

FIG. 1 schematically illustrates a rubber crawler 1 according to an embodiment of the present disclosure as viewed from the crawler inner circumferential side. FIG. 2 is a cross-sectional view taken along the line A-A of FIG. 1, illustrating a cross section of A-A of the rubber crawler 1 of FIG. 1. The line A-A in FIG. 1 extends along the crawler width direction.

It is preferable to mount the rubber crawler 1 on a foot portion of a traveling machine such as a construction machine (for example, a compact excavator) or an agricultural machine (for example, a tractor or a combine).

Although not illustrated in the drawings, the foot portion of a traveling machine includes a sprocket that is a drive wheel, one or more idlers that are idling wheels, and one or more track rollers. The sprocket has a plurality of pins on its outer circumferential side.

As illustrated in FIGS. 1 and 2, the rubber crawler 1 according to the present embodiment includes a crawler body 12, a plurality of lugs 14, one or more core body layers 15, and a plurality of cores 13 according to an embodiment of the present disclosure. In this way, the core 13 according to the present embodiment is used in the rubber crawler 1 according to the present embodiment.

The crawler body 12 is formed in an endless shape (annular shape). The crawler body 12 is configured in a band shape. The crawler body 12 is made of rubber.

In the present specification, the "crawler inner circumferential side IS", "crawler outer circumferential side OS", "crawler circumferential direction CD", "crawler width direction WD", and "crawler thickness direction TD" refer to the inner circumferential side, the outer circumferential side, the circumferential direction, the width direction, and the thickness direction of the crawler body 12, respectively, as indicated by arrows in the drawings.

In the present specification, one side in the crawler circumferential direction CD is referred to as "crawler circumferential direction first side CD1", and the other side in the crawler circumferential direction CD is referred to as "crawler circumferential direction second side CD2", as indicated by arrows in the drawings. In the present specification, one side in the crawler width direction WD is referred to as "crawler width direction first side WD1", and the other side in the crawler width direction WD is referred to as "crawler width direction second side WD2", as indicated by arrows in the drawings.

In the present specification, the "outer side in the crawler width direction WD" refers to a side farther from the center of the crawler width direction WD of the crawler body 12 in the crawler width direction WD, and the "inner side in the crawler width direction WD" refers to a side closer to the center of the crawler width direction WD of the crawler body 12 in the crawler width direction WD.

The rotation direction of the rubber crawler 1 during running of the traveling machine may be to the crawler circumferential direction first side CD1 or to the crawler circumferential direction second side CD2.

The plurality of lugs 14 provided in the rubber crawler 1 each protrude from the outer circumferential surface 122 of the crawler body 12 to the crawler outer circumferential side OS. The shape and arrangement of the lugs 14 may be arbitrary. An end surface of the lug 14 on the crawler outer circumferential side OS is configured to be in contact with a road surface. The lugs 14 are made of rubber.

In the present embodiment, the core body layer 15 has a plurality of cords 15C arranged along the crawler width direction WD. Each of these cords 15C extends along the entire circumference along the crawler circumferential direction CD. The core body layer 15 is buried inside the crawler body 12. The rubber crawler 1 may include the core body layer 15 only at one position in the crawler thickness direction TD, as in the example of FIG. 2 (in this case, the number of layers of the core body layer 15 is one). Alternatively, the rubber crawler 1 may include the core body layers 15 at a plurality of positions in the crawler thickness direction TD (in this case, the number of layers of the core body layer 15 is more than one).

The core body layer 15 has a function of preventing the crawler body 12 from extending in the crawler circumferential direction CD.

The cord 15C is made of metal (such as steel), for example.

Figure 3:
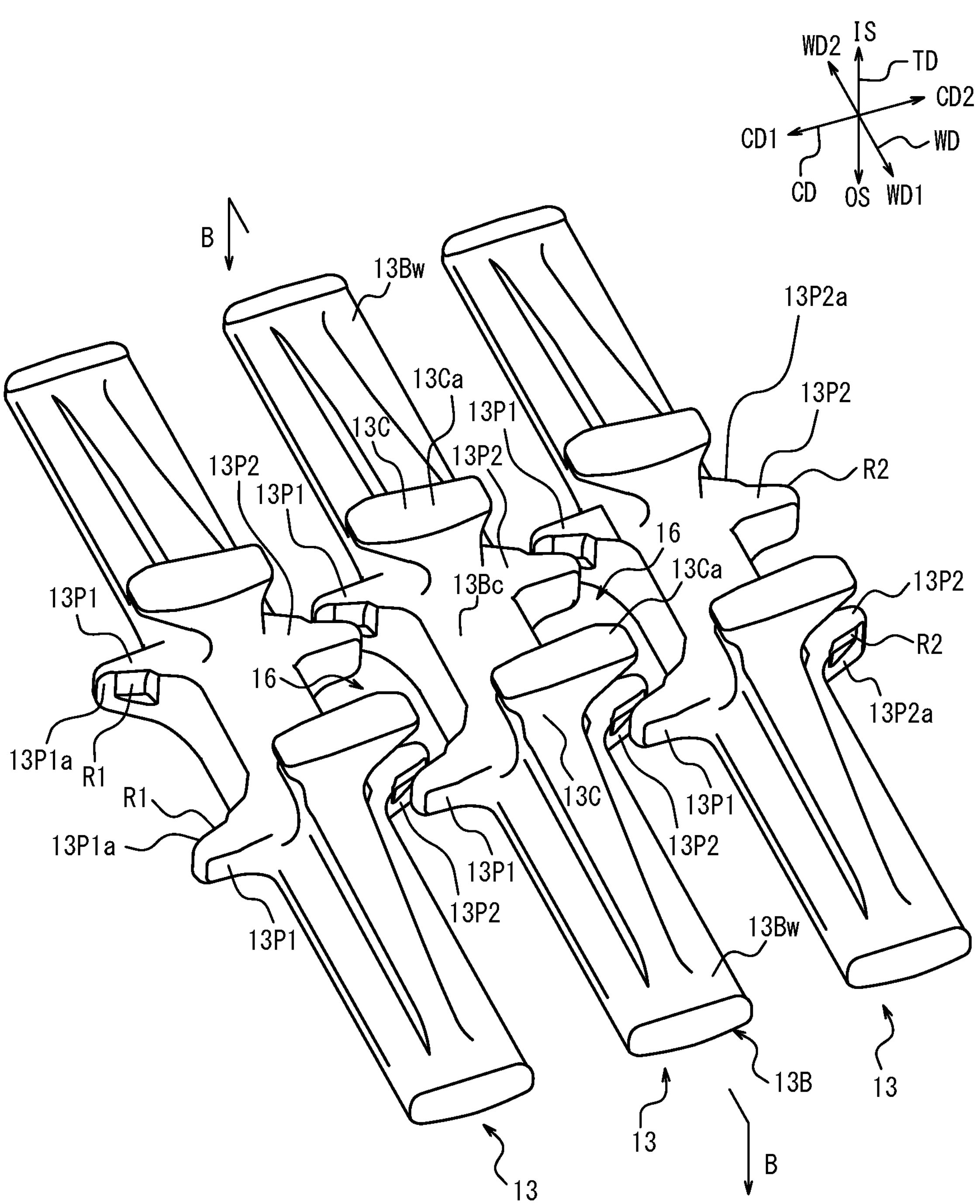
FIG. 3 is a perspective view illustrating a plurality of adjacent cores when the rubber crawler in FIG. 1 is in a flat state.
Figure 4:
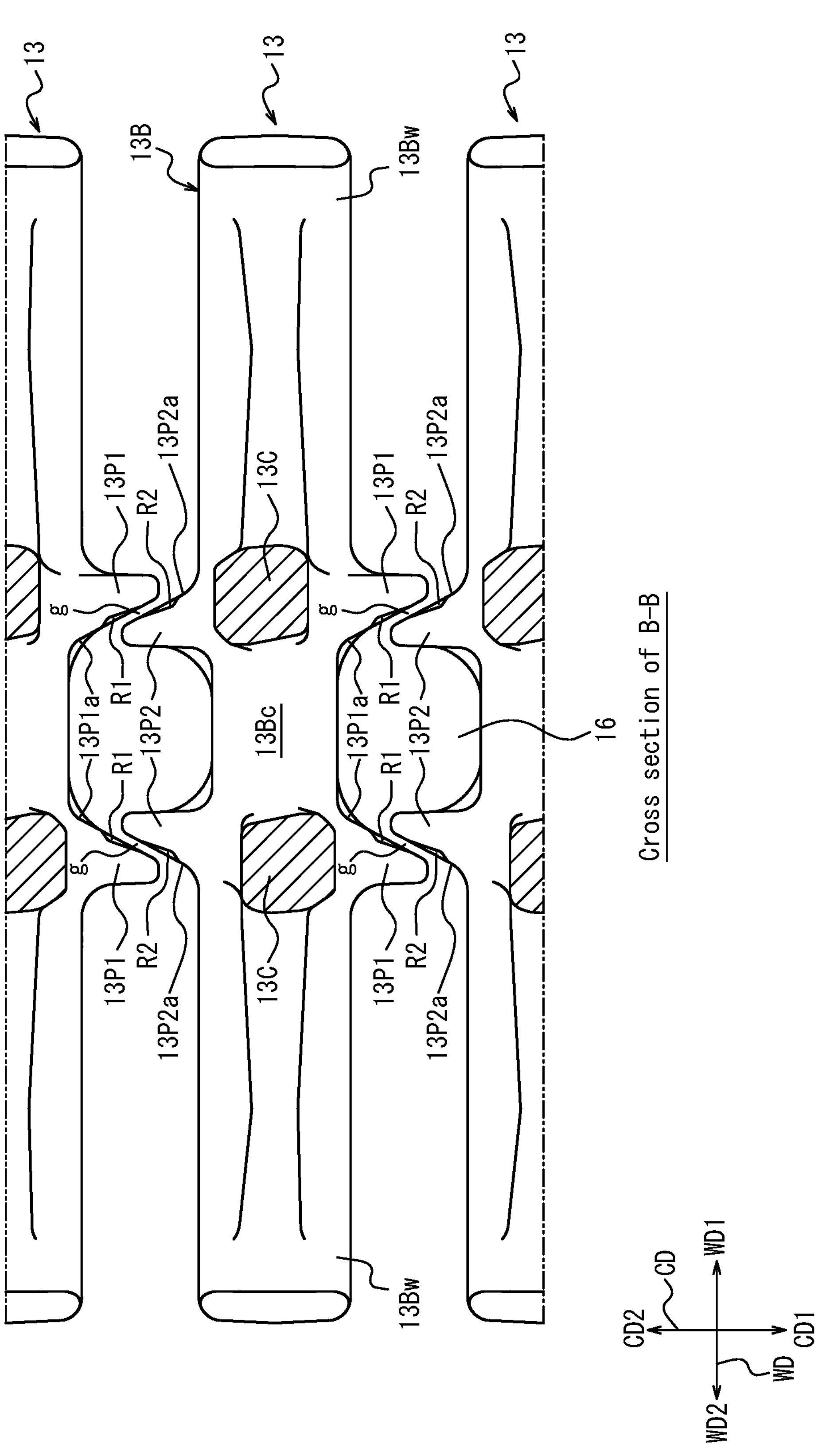
FIG. 4 is a cross-sectional view taken along the line B-B of FIG. 3, illustrating a cross section of B-B of the plurality of cores of FIG. 3.

FIG. 3 is a perspective view illustrating a plurality of adjacent cores 13 when the rubber crawler 1 in FIG. 1 is in a flat state. As used herein, "when the rubber crawler 1 is in a flat state" refers to a state in which, when only a part of the rubber crawler 1 in the crawler circumferential direction CD is viewed, the part is not bent by being wound around a sprocket or the like, but is flat. FIG. 4 is a cross-sectional view taken along the line B-B of FIG. 3, illustrating a cross section of B-B of the plurality of cores 13 of FIG. 3. FIG. 4 corresponds to a state in which each of the cores 13 in FIG. 3 is cut near the root of a horn portion 13C of the core and viewed from the crawler inner circumferential side IS.

As illustrated in FIGS. 1, 3, and 4, a plurality of cores 13 provided in the rubber crawler 1 are arranged along the crawler circumferential direction CD.

The core 13 is made of metal (such as iron or steel).

At least a part of the core 13 is buried inside the crawler body 12. The core 13 is arranged on the crawler inner circumferential side IS with respect to the core body layer 15 (FIG. 2).

Figure 5:
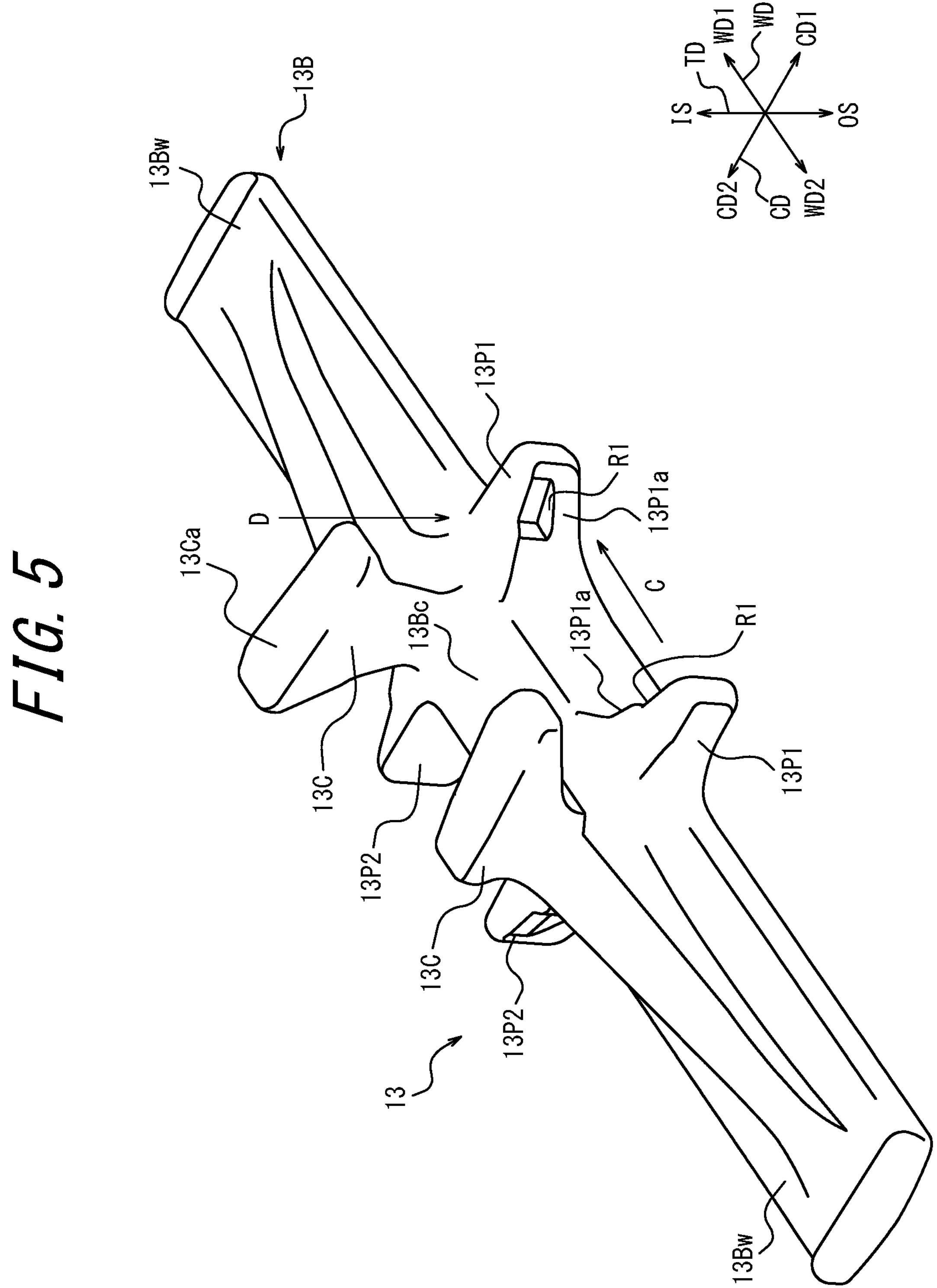
FIG. 5 is a perspective view illustrating a core in FIG. 3 when viewed from the side of a first projection.
Figure 7:
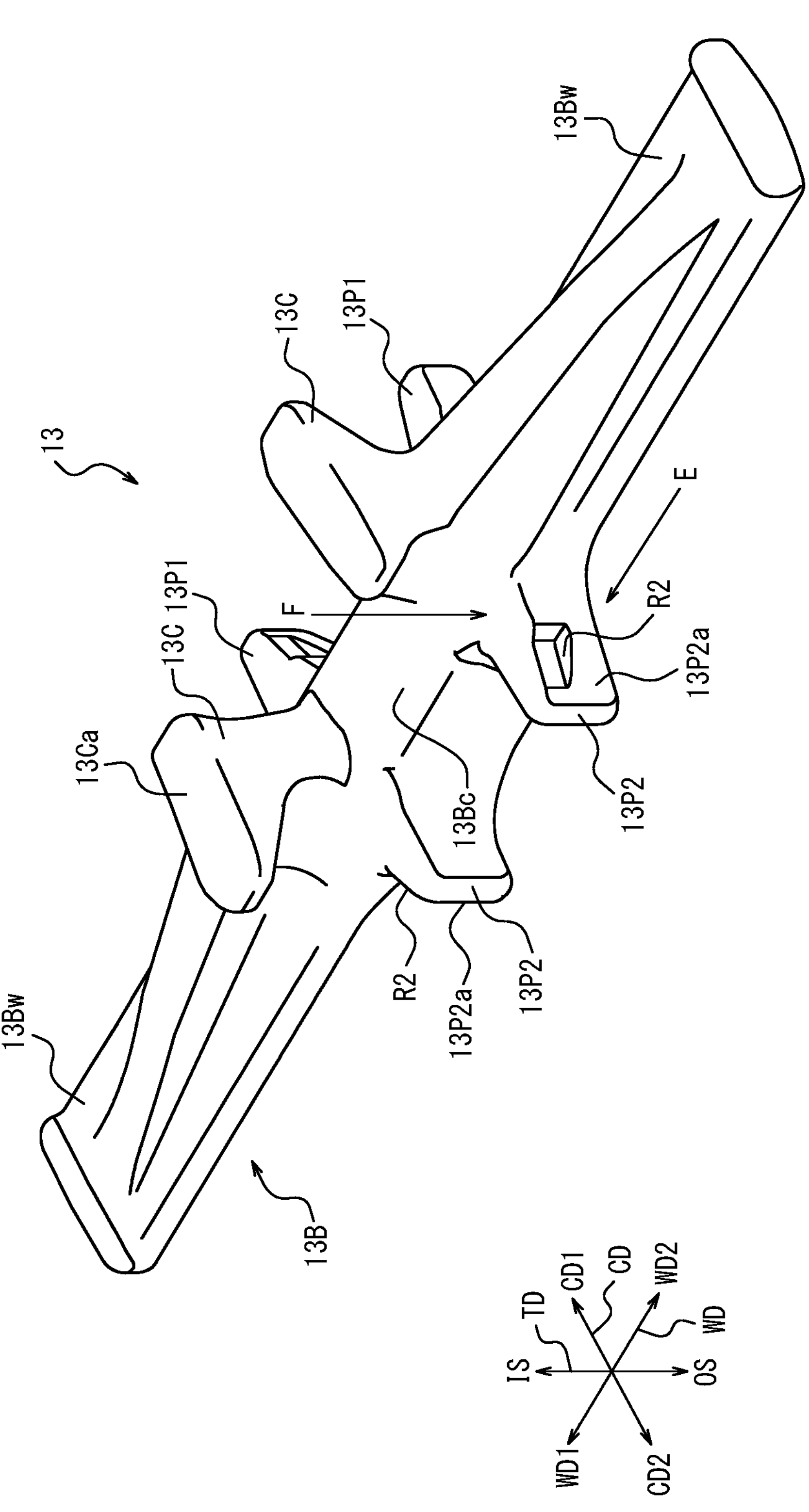
FIG. 7 is a perspective view illustrating a core in FIG. 3 when viewed from the side of a second projection.

FIG. 5 and FIG. 7 illustrate the core 13 of the present embodiment as a single unit from different angles, respectively.

The configuration of each core 13 is the same. In the following description, when a core 13 is described, the same applies to each of the cores 13.

As illustrated in FIGS. 3, 4, 5, and 7, the core 13 includes a base portion 13B, a pair of horn portions 13C, a pair of first projections (projection) 13P1, and a pair of second projections (projection) 13P2.

The base portion 13B extends in the crawler width direction WD. The base portion 13B is configured in a substantially plate shape in the present embodiment. In the present embodiment, the base portion 13B, as illustrated in FIG. 4, has a substantially rectangular shape with the crawler width direction WD as the longitudinal direction when viewed from the crawler inner circumferential side IS. However, the base portion 13B may have other shapes different from the one in the present embodiment.

The pair of horn portions 13C each extend from the base portion 13B to the crawler inner circumferential side IS. A part or the whole of the horn portion 13C protrudes toward the crawler inner circumferential side IS from the inner circumferential surface 121 of the crawler body 12 (FIG. 2). The pair of horn portions 13C are spaced from each other in the crawler width direction WD. The pair of horn portions 13C are positioned on the two sides of the center in the crawler width direction WD of the base portion 13B, respectively.

The pair of horn portions 13C of the core 13 have a function as a guide which restricts the movement of each rotator at the foot of the traveling machine (sprocket, idler, and track roller) in the crawler width direction WD without rubber or via rubber, thereby preventing loss of a wheel.

In the present embodiment, the top surfaces 13Ca of the pair of horn portions 13C (the end surface on the crawler inner circumferential side IS) are configured so that a track roller passes over them. Note that a track roller may be configured not to run on the top surfaces 13Ca of the pair of horn portions 13C, but to run on the outer side in the crawler width direction WD of the pair of horn portions 13C, for example.

A portion of the base portion 13B where the pair of horn portions 13C are connected is a central portion 13Bc. A portion of the base portion 13B outside the pair of horn portions 13C in the crawler width direction WD is a pair of wing portions 13B w.

The central portion 13Bc of the base portion 13B of the core 13 has a function of transmitting the driving force from a sprocket to the rubber crawler 1 by engagement with a pin of the sprocket without rubber or via rubber.

The base portion 13B of the core 13 may be entirely covered by the crawler body 12, or a part thereof (such as the central portion 13Bc) may be exposed to the outside without being covered by the crawler body 12.

In the horn portion 13C of the core 13, a part or the whole of a portion protruding from the inner circumferential surface 121 of the crawler body 12 toward the crawler inner circumferential side IS may be covered with a film-like coating rubber or may be exposed to the outside without being covered with a film-like coating rubber.

As illustrated in FIGS. 1 to 3, a hole 16 is formed between the central portions 13Bc of adjacent cores 13 in the crawler circumferential direction CD. The hole 16 is recessed toward the crawler outer circumferential side. The hole 16 is configured to allow entry of a pin of a sprocket. In this way, a pin of a sprocket can engage with the central portion 13Bc of the core 13 while being inserted into the hole 16, thus allowing the driving force to be transmitted to the rubber crawler 1.

The hole 16 may be configured as a bottomless hole (through hole) that penetrates the crawler body 12 in the crawler thickness direction TD, or it may be configured as a bottomed hole (recess) that does not penetrate the crawler body 12 in the crawler thickness direction TD.

As illustrated in FIGS. 3 to 5, the pair of first projections 13P1 each extend from the base portion 13B to the crawler circumferential direction first side CD1. The pair of first projections 13P1 are spaced from each other in the crawler width direction WD. The pair of first projections 13P1 are positioned on the two sides of the center in the crawler width direction WD of the base portion 13B, respectively. The pair of first projections 13P1 are positioned near the pair of horn portions 13C in the crawler width direction WD. A hole 16 is formed between the pair of first projections 13P1.

As illustrated in FIGS. 3, 4, and 7, the pair of second projections 13P2 each extend from the base portion 13B to the crawler circumferential direction second side CD2. The pair of second projections 13P2 are spaced from each other in the crawler width direction WD. The pair of second projections 13P2 are positioned on the two sides of the center in the crawler width direction WD of the base portion 13B, respectively. The pair of second projections 13P2 are positioned near the pair of horn portions 13C in the crawler width direction WD. A hole 16 is formed between the pair of second projections 13P2.

As illustrated in FIGS. 3 and 4, the pair of first projections 13P1 of each core 13 respectively face, in the crawler width direction WD, the pair of second projection 13P2 of another core 13 adjacent to the core 13 on the crawler circumferential direction first side CD1. In this way, when the cores 13 adjacent to each other move relative to each other in the crawler width direction WD, the pair of first projections 13P1 of each core 13 and the pair of second projections 13P2 of another core 13 adjacent to the core 13 on the crawler circumferential direction first side CD1 restrict the movement of each other in the crawler width direction WD by engagement (interference) with each other. As a result, slip (side slip) between the cores 13 in the crawler width direction WD can be prevented, thereby improving the rigidity of the rubber crawler 1 and preventing loss of a wheel and the like.

As illustrated in FIGS. 3 and 4, in the present embodiment, the pair of first projections 13P1 of a core 13 are positioned on the outer side in the crawler width direction WD with respect to the pair of second projections 13P2 of another core 13 adjacent to the core 13 on the crawler circumferential direction first side CD1.

Note that the pair of first projections 13P1 of a core 13 may be in any positional relationship in the crawler width direction WD with respect to the pair of second projections 13P2 of another core 13 adjacent to the core 13 on the crawler circumferential direction first side CD1.

As illustrated in FIG. 4, when the rubber crawler 1 is in a flat state, a clearance (gap) g exists between the pair of first projections 13P1 of a core 13 and the pair of second projections 13P2 of another core 13 adjacent to the core 13 on the crawler circumferential direction first side CD1.

The first projection 13P1 and the second projection 13P2 basically have similar configurations. In the following description, they will be described together for convenience.

As illustrated in FIGS. 3 to 5, in the present embodiment, the pair of first projections 13P1 of a core 13 respectively have a first recess R1 on a surface 13P1*a* facing the second projections 13P2 of another adjacent core 13 (the surface on the inner side in the crawler width direction WD in the present embodiment).

As illustrated in FIGS. 3, 4, and 7, in the present embodiment, the pair of second projections 13P2 of each core 13 respectively have a second recess R2 on a surface 13P2*a* facing the first projections 13P1 of another adjacent core 13 (the surface on the outer side in the crawler width direction WD in the present embodiment).

Figure 9:
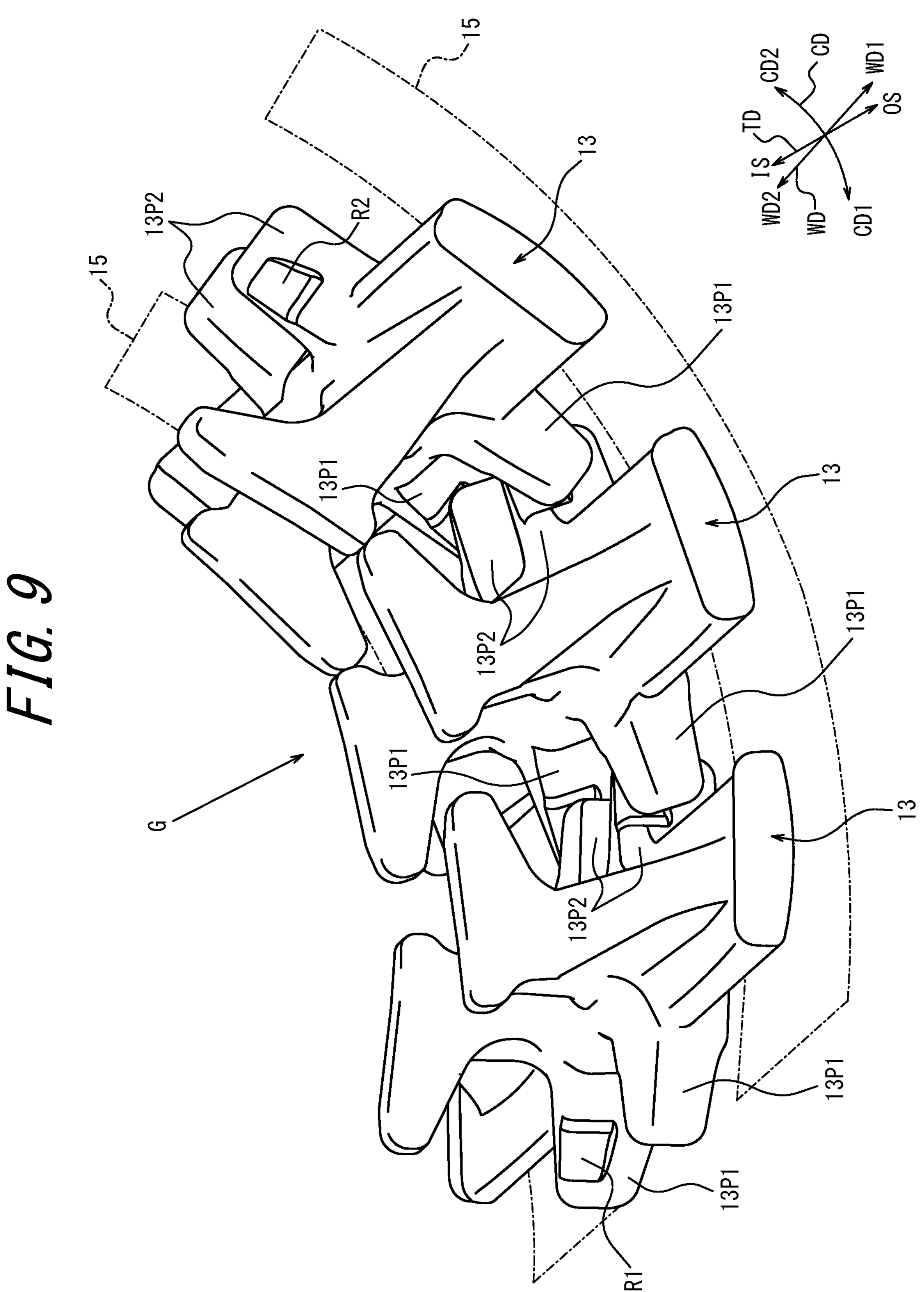
Figure 10:
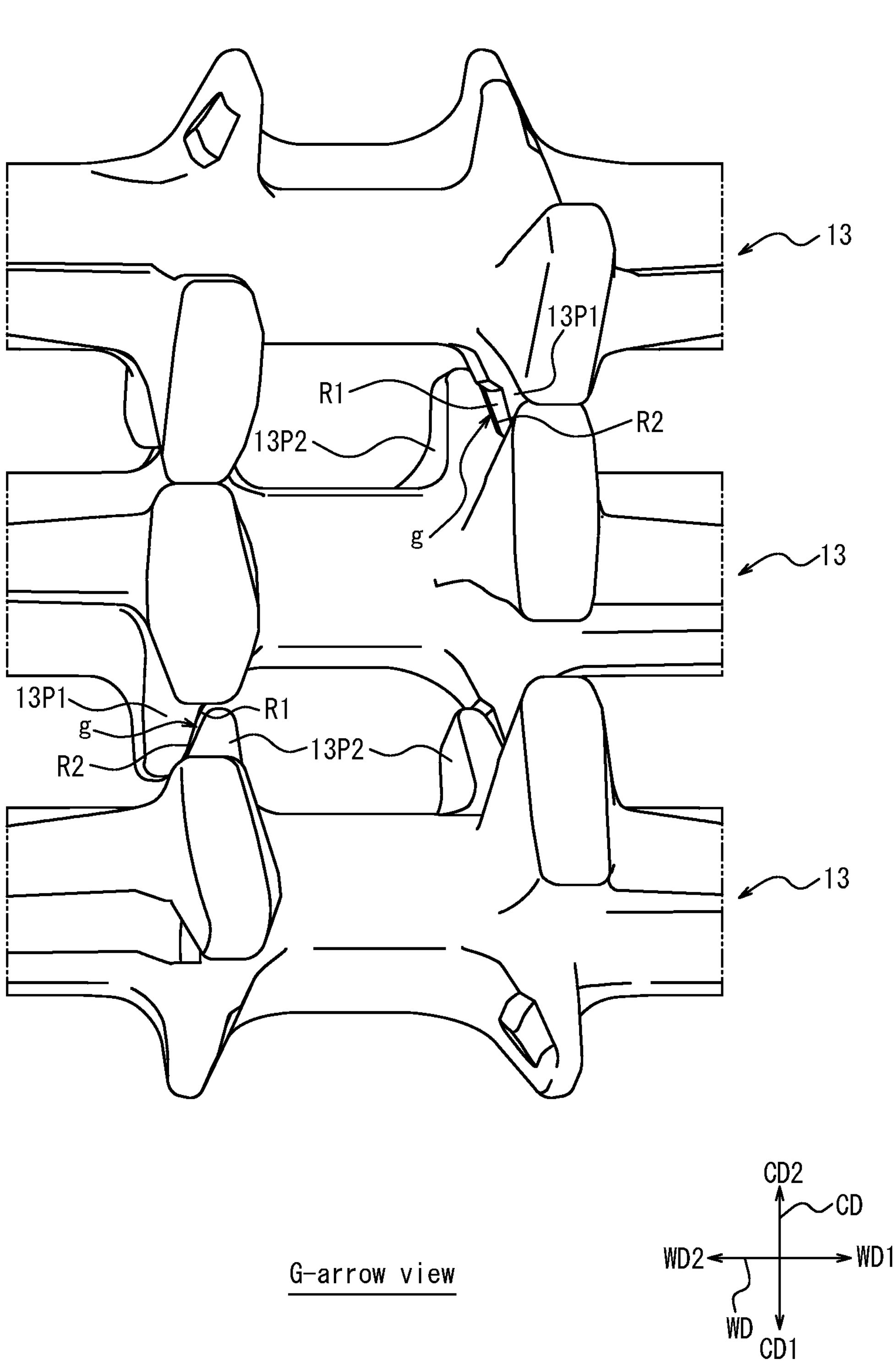
FIG. 10 is a G-arrow view illustrating the plurality of cores in FIG. 9 when viewed in the direction of the G arrow.

FIG. 9 is a perspective view illustrating a plurality of adjacent cores 13 when the rubber crawler 1 of the present embodiment is bent around a sprocket or the like. As used herein, "when the rubber crawler 1 is bent around a sprocket or the like" refers to a state in which, when only a part in the crawler circumferential direction CD of the rubber crawler 1 is viewed, the part is bent by being wound around a sprocket or an idler. FIG. 10 is a G-arrow view illustrating the plurality of cores 13 in FIG. 9 when viewed in the direction of the G arrow.

Since the core 13 is on the crawler inner circumferential side IS with respect to the core layer 15, adjacent cores 13 come closer to each other when the rubber crawler 1 is bent around a sprocket or an idler, as illustrated in FIG. 9. As a result, the clearance g between the first projection 13P1 and the second projection 13P2 of the adjacent cores 13 is narrowed. However, in the present embodiment, the first projection 13P1 and the second projection 13P2 have a first recess R1 and a second recess R2, respectively, on surfaces 13P1*a* and 13P2*a* facing each other, and the first recess R1 and the second recess R2 face each other. Therefore, compared to a case without the first recess R1 or the second recess R2 (that is, a case where substantially flat surfaces face each other), the clearance g can be expanded when the rubber crawler 1 is bent around a sprocket or the like, and the risk of contact (interference) between the first projection 13P1 and the second projection 13P2 can be reduced when the rubber crawler 1 is bent around a sprocket or the like, as illustrated in FIG. 10. Therefore, when the rubber crawler 1 is bent around a sprocket or the like, the flexural rigidity of the rubber crawler 1 can be prevented from becoming too high. As a result, the possibility that the rubber crawler 1 is difficult to be wound around a sprocket or the like and the possibility of an increase in loss of driving force can be reduced.

FIG. 6A is an enlarged view of the first projection 13P1 in FIG. 5, FIG. 6B is a C-arrow view illustrating the first projection 13P1 in FIG. 5 when viewed in the direction of the C arrow, and FIG. 6C is a D-arrow view illustrating the first projection 13P1 in FIG. 5 when viewed in the direction of the D arrow.

As illustrated in FIGS. 6A to 6C, in the present embodiment, the first projection 13P1 has a first section surface R11 facing the crawler inner circumferential side IS, a second section surface R12 facing the side facing the second projection 13P2 of another core 13 (the inner side in the crawler width direction WD in the present embodiment) of the two sides in the crawler width direction WD, and a third section surface R13 facing the crawler circumferential direction first side CD1, on the surface 13P1*a* facing the second projection 13P2 of another adjacent core 13 (the surface on the inner side in the crawler width direction WD in the present embodiment). The first recess R1 is defined by the first section surface R11, the second section surface R12, the third section surface R13, an opening in the surface 13P1*a* facing the second projection 13P2 of another core 13 (the surface on the inner side in the crawler width direction WD in the present embodiment) of the first projection 13P1 in the first recess R1, and an opening in the surface on the crawler inner circumferential side IS of the first projection 13P1 in the first recess R1.

Figures 8A, 8B, 8C:
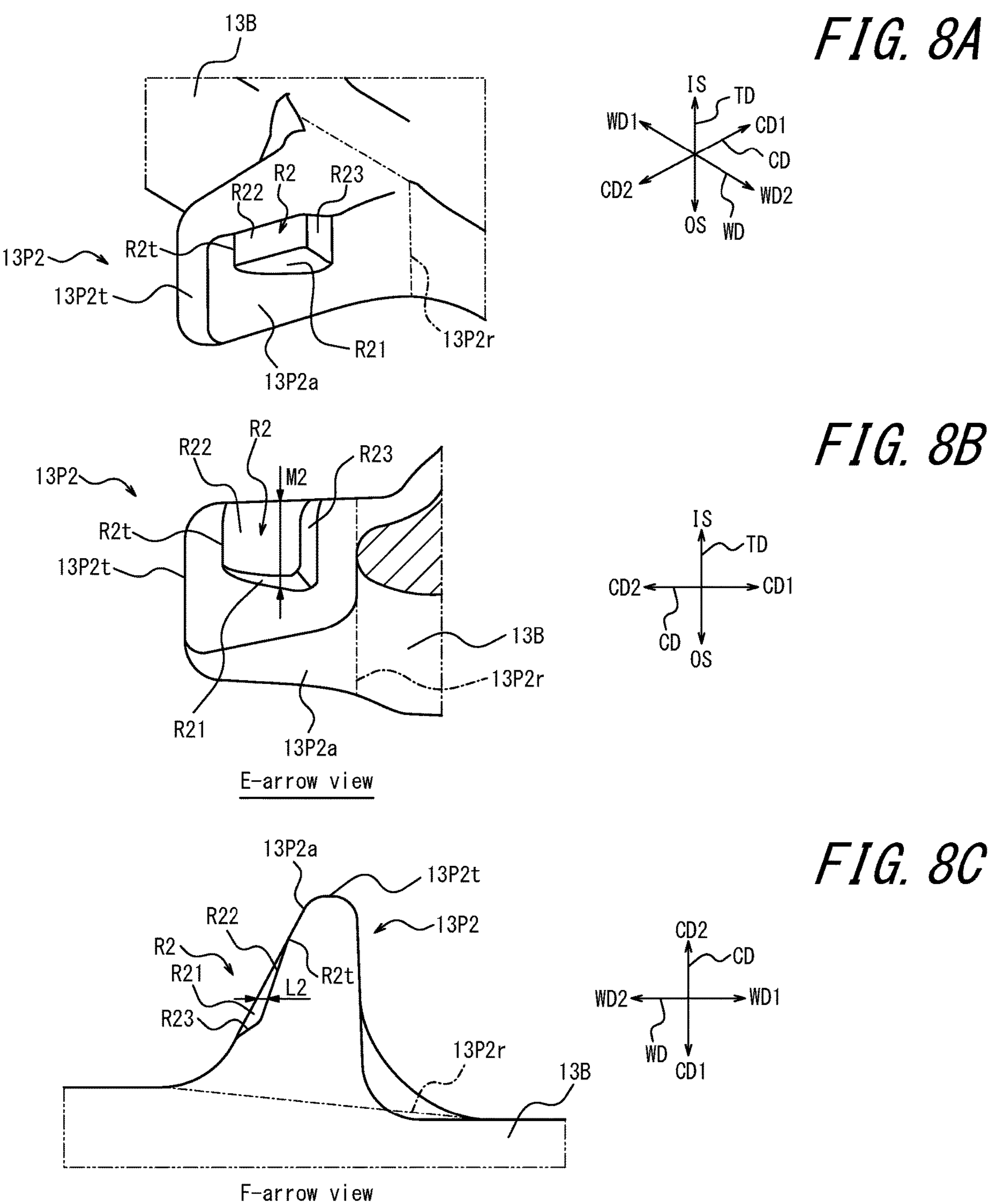
FIG. 8A is an enlarged view of the second projection in FIG. 7.
FIG. 8B is an E-arrow view illustrating the second projection in FIG. 7 when viewed in the direction of the E arrow.
FIG. 8C is an F-arrow view illustrating the second projection in FIG. 7 when viewed in the direction of the F arrow.

FIG. 8A is an enlarged view of the second projection 13P2 in FIG. 7, FIG. 8B is an E-arrow view illustrating the second projection 13P2 in FIG. 7 when viewed in the direction of the E arrow, and FIG. 8C is an F-arrow view illustrating the second projection 13P2 in FIG. 7 when viewed in the direction of the F arrow.

As illustrated in FIGS. 8A to 8C, in the present embodiment, the second projection 13P2 has a first section surface R21 facing the crawler inner circumferential side IS, a second section surface R22 facing the side facing the first projection 13P1 of another core 13 (the outer side in the crawler width direction WD in the present embodiment) of the two sides in the crawler width direction WD, and a third section surface R23 facing the crawler circumferential direction second side CD2, on the surface 13P2*a* facing the first projection 13P1 of another adjacent core 13 (the surface on the outer side in the crawler width direction WD in the present embodiment). The second recess R2 is defined by the first section surface R21, the second section surface R22, the third section surface R23, an opening in the surface 13P2*a* facing the first projection 13P1 of another core 13 (the surface on the outer side in the crawler width direction WD in the present embodiment) of the second projection 13P2 in the second recess R2, and an opening in the surface on the crawler inner circumferential side IS of the second projection 13P2 in the second recess R2.

As illustrated in FIGS. 6A to 6C, in the first recess R1, an end R1*t* on the side of a tip 13P1*t* of the first projection 13P1 in the crawler circumferential direction CD of the first recess R1 is preferably positioned closer to the side of a root 13P1*r* of the first projection 13P1 than the tip 13P1*t* of the first projection 13P1 in the crawler circumferential direction CD. In this way, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

As used herein, the "tip 13P1*t* of the first projection 13P1" refers to the end on the crawler circumferential direction first side CD1 of the first projection 13P1. Therefore, the "end R1*t* on the side of a tip 13P1*t* of the first projection 13P1 in the crawler circumferential direction CD" of the first recess R1 refers to the end on the crawler circumferential direction first side CD1 of the first recess R1. Further, the "root 13P1*r* of the first projection 13P1" refers to the end on the crawler circumferential direction second side CD2 of the first projection 13P1. The root 13P1*r* of the first projection 13P1 is connected to the end surface on the crawler circumferential direction first side CD1 of the base portion 13B.

As illustrated in FIGS. 8A to 8C, in the second recess R2, an end R2*t* on the side of a tip 13P2*t* of the second projection 13P2 in the crawler circumferential direction CD of the second recess R2 is preferably positioned closer to the side of a root 13P2*r* of the second projection 13P2 than the tip 13P2*t* of the second projection 13P2 in the crawler circumferential direction CD. In this way, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

As used herein, the "tip 13P2*t* of the second projection 13P2" refers to the end on the crawler circumferential direction second side CD2 of the second projection 13P2. Therefore, the "end R2*t* on the side of a tip 13P2*t* of the second projection 13P2 in the crawler circumferential direction CD" of the second recess R2 refers to the end on the crawler circumferential direction second side CD2 of the second recess R2. Further, the "root 13P2*r* of the second projection 13P2" refers to the end on the crawler circumferential direction first side CD1 of the second projection 13P2. The root 13P2*r* of the second projection 13P2 is connected to the end surface on the crawler circumferential direction second side CD2 of the base portion 13B.

If the end R1*t* on the side of the tip 13P1*t* of the first projection 13P1 in the crawler circumferential direction CD of the first recess R1 is positioned at the same position as the tip 13P1*t* of the first projection 13P1 in the crawler circumferential direction CD, the rigidity of the first projection 13P1 may be excessively deteriorated, and when the rubber crawler 1 is bent around a sprocket or the like, the first projection 13P1 and the second projection 13P2 may undesirably engage with each other if, for example, a twist occurs between the cores 13 adjacent to each other.

Similarly, if the end R2*t* on the side of the tip 13P2*t* of the second projection 13P2 in the crawler circumferential direction CD of the second recess R2 is positioned at the same position as the tip 13P2*t* of the second projection 13P2 in the crawler circumferential direction CD, the rigidity of the second projection 13P2 may be excessively deteriorated, and when the rubber crawler 1 is bent around a sprocket or the like, the first projection 13P1 and the second projection 13P2 may undesirably engage with each other if, for example, a twist occurs between the cores 13 adjacent to each other.

For the first recess R1, in a portion including at least the end R1*t* on the side of the tip 13P1*t* of the first projection 13P1 in the crawler circumferential direction CD, the length L1 in the crawler width direction WD preferably increases as it goes toward the side of the root 13P1*r* of the first projection 13P1 in the crawler circumferential direction CD, as illustrated in FIG. 6C. In this way, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

For the second recess R2, in a portion including at least the end R2*t* on the side of the tip 13P2*t* of the second projection 13P2 in the crawler circumferential direction CD, the length L2 in the crawler width direction WD preferably increases as it goes toward the side of the root 13P2*r* of the second projection 13P2 in the crawler circumferential direction CD, as illustrated in FIG. 8C. In this way, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

The first recess R1 is preferably open on the crawler inner circumferential side IS (that is, open on the surface on the crawler inner circumferential side IS of the first projection 13P1) and closed on the crawler outer circumferential side OS (that is, not open on the surface on the crawler outer circumferential side OS of the first projection 13P1), as illustrated in FIGS. 6A and 6B. When the rubber crawler 1 is bent around a sprocket or the like, the clearance g between the first projection 13P1 and the second projection 13P2 tends to narrow especially on the crawler inner circumferential side IS, and conversely, the clearance g tends to widen on the crawler outer circumferential side OS. Therefore, by arranging the first recess R1 only on the crawler inner circumferential side IS as described above, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

The second recess R2 is preferably open on the crawler inner circumferential side IS (that is, open on the surface on the crawler inner circumferential side IS of the second projection 13P2) and closed on the crawler outer circumferential side OS (that is, not open on the surface on the crawler outer circumferential side OS of the second projection 13P2), as illustrated in FIGS. 8A and 8B. When the rubber crawler 1 is bent around a sprocket or the like, the clearance g between the first projection 13P1 and the second projection 13P2 tends to narrow especially on the crawler inner circumferential side IS, and conversely, the clearance g tends to widen on the crawler outer circumferential side OS. Therefore, by arranging the second recess R2 only on the crawler inner circumferential side IS as described above, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

If the first recess R1 and the second recess R2 are not open on the crawler inner circumferential side IS, the first projection 13P1 and the second projection 13P2 tends to come into contact with each other when the rubber crawler 1 is bent around a sprocket or the like.

The first recess R1 preferably has a substantially triangular prism shape, as illustrated in FIG. 6A. The substantially triangular prism shape has the first section surface R11 as the bottom surface and has the crawler thickness direction TD as the height direction. The first section surface R11 has a substantially triangular shape. When the first recess R1 has such a shape, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

The second recess R2 preferably has a substantially triangular prism shape, as illustrated in FIG. 8A. The substantially triangular prism shape has the first section surface R21 as the bottom surface and has the crawler thickness direction TD as the height direction. The first section surface R21 has a substantially triangular shape. When the second recess R2 has such a shape, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

In the present specification, the term "substantially triangular prism shape" is a concept including a substantially truncated triangular prism shape. In the present embodiment, the first recess R1 and the second recess R2 have the first section surfaces R11 and R21, which are bottom surfaces, inclined with respect to the height direction (crawler thickness direction TD), thereby forming a substantially truncated triangular prism shape.

The length M1 in the crawler thickness direction TD of the first recess R1 preferably increases as it goes toward the side of the root 13P1*r* of the first projection 13P1 in the crawler circumferential direction CD, as illustrated in FIG. 6B. In this way, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

As used herein, if the length in the crawler thickness direction TD of the first recess R1 is not uniform along the crawler width direction WD as the example illustrated in FIGS. 6A to 6C, "the length M1 in the crawler thickness direction TD" of the first recess R1 refers to the maximum value thereof. In the example illustrated in FIGS. 6A to 6C, "the length M1 in the crawler thickness direction TD" of the first recess R1 is the length in the crawler thickness direction TD of the first recess R1, which is measured at the end of the side facing the second projection 13P2 of another core 13 (the inner side in the crawler width direction WD in the present embodiment) of the two sides in the crawler width direction WD.

From a similar point of view, the first section surface R11 of the first recess R1 preferably extends toward the crawler outer circumferential side OS as it goes toward the side of the root 13P1*r* of the first projection 13P1 in the crawler circumferential direction CD.

The length M2 in the crawler thickness direction TD of the second recess R2 preferably increases as it goes toward the side of the root 13P2*r* of the second projection 13P2 in the crawler circumferential direction CD, as illustrated in FIG. 8B. In this way, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

As used herein, if the length in the crawler thickness direction TD of the second recess R2 is not uniform along the crawler width direction WD as the example illustrated in FIGS. 8A to 8C, "the length M2 in the crawler thickness direction TD" of the second recess R2 refers to the maximum value thereof. In the example illustrated in FIGS. 8A to 8C, "the length M2 in the crawler thickness direction TD" of the second recess R2 is the length in the crawler thickness direction TD of the second recess R2, which is measured at the end of the side facing the first projection 13P1 of another core 13 (the outer side in the crawler width direction WD in the present embodiment) of the two sides in the crawler width direction WD.

From a similar point of view, the first section surface R21 of the second recess R2 preferably extends toward the crawler outer circumferential side OS as it goes toward the side of the root 13P2*r* of the second projection 13P2 in the crawler circumferential direction CD.

A ratio of the length M1 in the crawler thickness direction TD of the first recess R1 to the length in the crawler thickness direction TD of the first projection 13P1, which is measured at a position in the crawler width direction WD and the crawler circumferential direction CD where the length M1 in the crawler thickness direction TD of the first recess R1 (FIG. 6B) is maximum, is preferably 30% to 70%. In this way, the first recess R1 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the first projection 13P1 can be suppressed. As a result, it is possible to suppress deterioration of the function of preventing side slip (and thus the function of preventing loss of a wheel), which is the original function of the first projection 13P1 and the second projection 13P2.

In the example illustrated in FIGS. 6A to 6C, the "position in the crawler width direction WD and the crawler circumferential direction CD where the length M1 in the crawler thickness direction TD of the first recess R1 is maximum" specifically refers to a position in the crawler width direction WD and the crawler circumferential direction CD on the side facing the second projection 13P2 of another core 13 (the inner side in the crawler width direction WD in the present embodiment) of the two sides in the crawler width direction WD and at the end on the crawler circumferential direction second side CD2 of the first recess R1.

A ratio of the length M2 in the crawler thickness direction TD of the second recess R2 to the length in the crawler thickness direction TD of the second projection 13P2, which is measured at a position in the crawler width direction WD and the crawler circumferential direction CD where the length M2 in the crawler thickness direction TD of the second recess R2 (FIG. 8B) is maximum, is preferably 30% to 70%. In this way, the second recess R2 is arranged in a portion where the first projection 13P1 and the second projection 13P2 are highly likely to come into contact with each other when the rubber crawler 1 is bent around a sprocket or the like, so that the contact between the first projection 13P1 and the second projection 13P2 can be suppressed, and a decrease in ease of engagement between the first projection 13P1 and the second projection 13P2 when the cores 13 adjacent to each other move relative to each other in the crawler width direction WD and a decrease in rigidity of the second projection 13P2 can be suppressed. As a result, it is possible to suppress deterioration of the function of preventing side slip (and thus the function of preventing loss of a wheel), which is the original function of the first projection 13P1 and the second projection 13P2.

In the example illustrated in FIGS. 8A to 8C, the "position in the crawler width direction WD and the crawler circumferential direction CD where the length M2 in the crawler thickness direction TD of the second recess R2 is maximum" specifically refers to a position in the crawler width direction WD and the crawler circumferential direction CD on the side facing the first projection 13P1 of another core 13 (the outer side in the crawler width direction WD in the present embodiment) of the two sides in the crawler width direction WD and at the end on the crawler circumferential direction first side CD1 of the second recess R2.

In the first projection 13P1, the surface 13P1*a* facing the second projection 13P2 of another adjacent core 13 (the surface on the inner side in the crawler width direction WD in the present embodiment) of the surfaces on the two sides in the crawler width direction WD preferably extends toward the side facing the second projection 13P2 of another core 13 (the inner side in the crawler width direction WD in the present embodiment) of the two sides in the crawler width direction WD as it goes toward the side of the root 13P1*r* of the first projection 13P1 in the crawler circumferential direction CD, as illustrated in FIGS. 6A to 6C. In the first projection 13P1, the surface on the crawler inner circumferential side IS is preferably substantially perpendicular to the crawler thickness direction TD. The first section surface R11 of the first recess R1 preferably extends toward the crawler outer circumferential side OS as it goes toward the side facing the second projection 13P2 of another core 13 (the inner side in the crawler width direction WD in the present embodiment) of the two sides in the crawler width direction WD. The second section surface R12 of the first recess R1 preferably extends toward the side facing the second projection 13P2 of another core 13 (the inner side in the crawler width direction WD in the present embodiment) of the two sides in the crawler width direction WD as it goes toward the side of the root 13P1*r* of the first projection 13P1 in the crawler circumferential direction CD. The third section surface R13 of the first recess R1 preferably extends toward the side facing the second projection 13P2 of another core 13 (the inner side in the crawler width direction WD in the present embodiment) of the two sides in the crawler width direction WD as it goes toward the side of the root 13P1*r* of the first projection 13P1 in the crawler circumferential direction CD. Note that the angle of the acute-angle side with respect to the crawler width direction WD of the third section surface R13 is preferably smaller than the angle of the acute-angle side with respect to the crawler width direction WD of the second section surface R12.

In the second projection 13P2, the surface 13P2*a* facing the first projection 13P1 of another adjacent core 13 (the surface on the outer side in the crawler width direction WD in the present embodiment) of the surfaces on the two sides in the crawler width direction WD preferably extends toward the side facing the first projection 13P1 of another core 13 (the outer side in the crawler width direction WD in the present embodiment) of the two sides in the crawler width direction WD as it goes toward the side of the root 13P2*r* of the second projection 13P2 in the crawler circumferential direction CD, as illustrated in FIGS. 8A to 8C. In the second projection 13P2, the surface on the crawler inner circumferential side IS is preferably substantially perpendicular to the crawler thickness direction TD. The first section surface R21 of the second recess R2 preferably extends toward the crawler outer circumferential side OS as it goes toward the side facing the first projection 13P1 of another core 13 (the outer side in the crawler width direction WD in the present embodiment) of the two sides in the crawler width direction WD. The second section surface R22 of the second recess R2 preferably extends toward the side facing the first projection 13P1 of another core 13 (the outer side in the crawler width direction WD in the present embodiment) of the two sides in the crawler width direction WD as it goes toward the side of the root 13P2*r* of the second projection 13P2 in the crawler circumferential direction CD. The third section surface R23 of the second recess R2 preferably extends toward the side facing the first projection 13P1 of another core 13 (the outer side in the crawler width direction WD in the present embodiment) of the two sides in the crawler width direction WD as it goes toward the side of the root 13P2*r* of the second projection 13P2 in the crawler circumferential direction CD. Note that the angle of the acute-angle side with respect to the crawler width direction WD of the third section surface R23 is preferably smaller than the angle of the acute-angle side with respect to the crawler width direction WD of the second section surface R22.

In the embodiment described above, each of the pair of first projections 13P1 of the core 13 has a first recess R1, and each of the pair of second projections 13P2 of the core 13 has a second recess R2 (FIG. 4). In this case, the clearance P between the first projection 13P1 and the second projection 13P2 is widened when the rubber crawler 1 is bent around a sprocket or the like. As a result, the effect of suppressing the contact between the first projection 13P1 and the second projection 13P2 when the rubber crawler 1 is bent around a sprocket or the like is the best.

Figure 11:
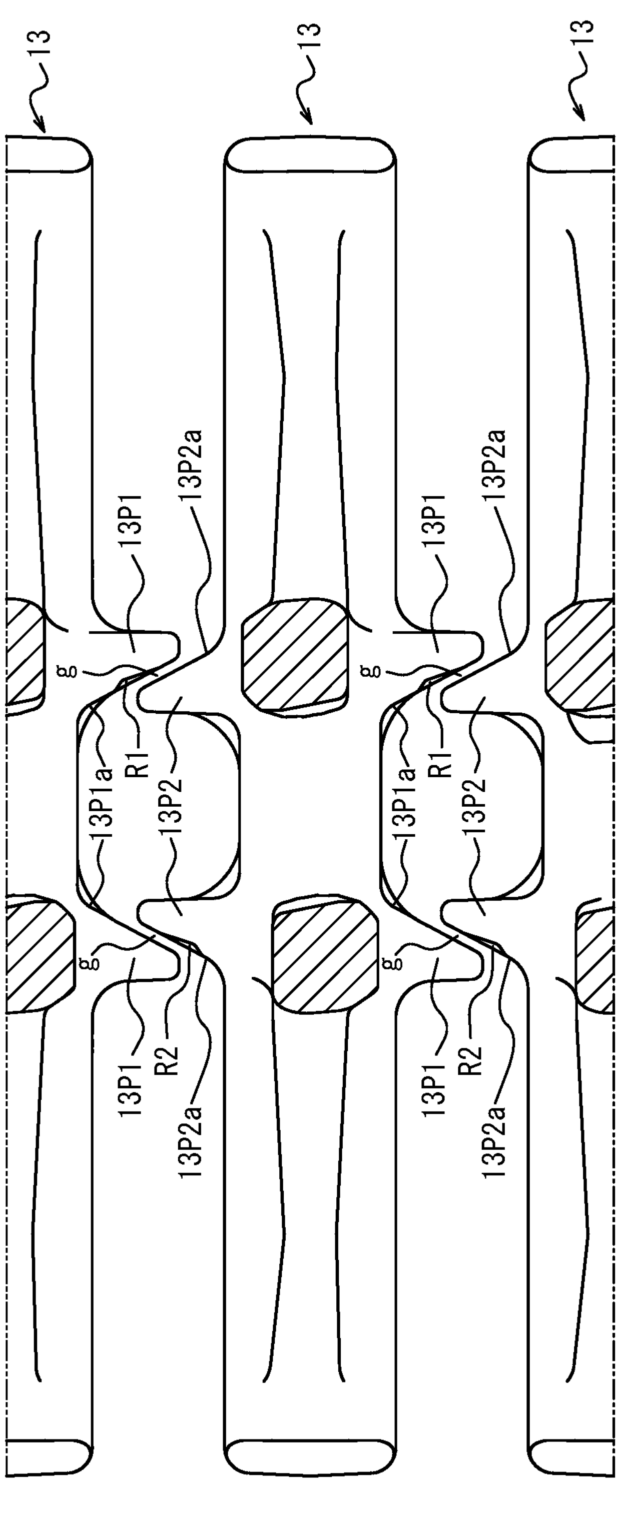
FIG. 11 is a drawing corresponding to FIG. 4, which is a drawing for explaining a rubber crawler according to a modified example of the present disclosure.
Figure 11:
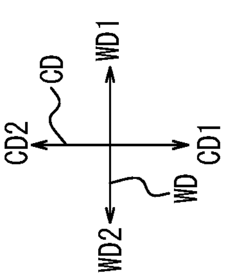

For example, it is also possible that only the first projection 13P1 on the crawler width direction first side WD1 of the pair of first projections 13P1 of the core 13 has a first recess R1, and only the second projection 13P2 on the crawler width direction second side WD2 of the pair of second projections 13P2 of the core 13 has a second recess R2, as in the modified example illustrated in FIG. 11. In this case, in the first projection 13P1 on the crawler width direction second side WD2 of the pair of first projections 13P1 of the core 13, the surface 13P1*a* facing the second projection 13P2 of another adjacent core 13 of the surfaces on the two sides in the crawler width direction WD is a substantially flat surface, and in the second projection 13P2 on the crawler width direction first side WD1 of the pair of second projections 13P2 of the core 13, the surface 13P2*a* facing the first projection 13P1 of another adjacent core 13 of the surfaces on the two sides in the crawler width direction WD is a substantially flat surface. Even in this case, since the first recess R1 and the second recess R2 each face a substantially flat surface, the clearance P between the first projection 13P1 and the second projection 13P2 when the rubber crawler 1 is bent around a sprocket or the like is widened compared to a case where neither a first recess R1 nor a second recess R2 is provided (that is, a case where substantially flat surfaces face each other). As a result, the contact between the first projection 13P1 and the second projection 13P2 when the rubber crawler 1 is bent around a sprocket or the like can be suppressed.

Alternatively, it is also possible that only the first projection 13P1 on the crawler width direction first side WD1 of the pair of first projections 13P1 of the core 13 has a first recess R1, and neither of the pair of second projections 13P2 of the core 13 has a second recesses R2. Even in this case, since the first recess R1 faces a substantially flat surface on the crawler width direction first side WD1, the clearance P between the first projection 13P1 and the second projection 13P2 when the rubber crawler 1 is bent around a sprocket or the like is widened compared to a case where neither a first recess R1 nor a second recess R2 is provided. As a result, the contact between the first projection 13P1 and the second projection 13P2 can be suppressed.

INDUSTRIAL APPLICABILITY

The rubber crawler of the present disclosure can be suitably mounted on a foot portion of any traveling machine such as a construction machine (for example, a compact excavator) or an agricultural machine (for example, a tractor or a combine).

The invention claimed is:

1. A rubber crawler comprising:

an endless crawler body made of rubber, and a plurality of cores embedded in the crawler body and arranged along a crawler circumferential direction, wherein each of the cores comprises:

a base portion extending in a crawler width direction, a pair of horn portions extending from the base portion to a crawler inner circumferential side, a pair of first projections extending from the base portion to a crawler circumferential direction first side, and a pair of second projections extending from the base portion to a crawler circumferential direction second side, wherein the pair of first projections of each of the cores respectively face the pair of second projections of another core adjacent to the core on the crawler circumferential direction first side in the crawler width direction, at least a first projection on a crawler width direction first side in the pair of first projections of each of the cores has a first recess on a surface facing the second projection of another core, the first recess is configured such that an end on a side of a tip of the first projection in the crawler circumferential direction of the first recess is positioned closer to a side of a root of the first projection than the tip of the first projection in the crawler circumferential direction, the first recess is configured such that, in a portion including at least the end on the side of the tip of the first projection in the crawler circumferential direction, a length in the crawler width direction increases as it goes toward the side of the root of the first projection in the crawler circumferential direction, the first recess is open on a crawler inner circumferential side and closed on a crawler outer circumferential side, and the first recess has a substantially triangular prism shape.

2. The rubber crawler according to claim 1, wherein the first recess is configured such that a length in a crawler thickness direction increases as it goes toward the side of the root of the first projection in the crawler circumferential direction.

3. The rubber crawler according to claim 1, wherein at least a second projection on a crawler width direction second side in the pair of second projections of each of the cores has a second recess on a surface facing the first projection of another core, the second recess is configured such that an end on a side of a tip of the second projection in the crawler circumferential direction of the second recess is positioned closer to a side of a root of the second projection than the tip of the second projection in the crawler circumferential direction, the second recess is configured such that, in a portion including at least the end on the side of the tip of the second projection in the crawler circumferential direction, a length in the crawler width direction increases as it goes toward the side of the root of the second projection in the crawler circumferential direction, the second recess is open on a crawler inner circumferential side and closed on a crawler outer circumferential side, and the second recess has a substantially triangular prism shape.

4. The core used in the rubber crawler according to claim 1.

5. The core used in the rubber crawler according to claim 2.

6. The core used in the rubber crawler according to claim 3.

* * * * *